July 1, 1958 R. C. ZEIDLER 2,841,262
CLUTCH
Filed May 16, 1952 3 Sheets-Sheet 2
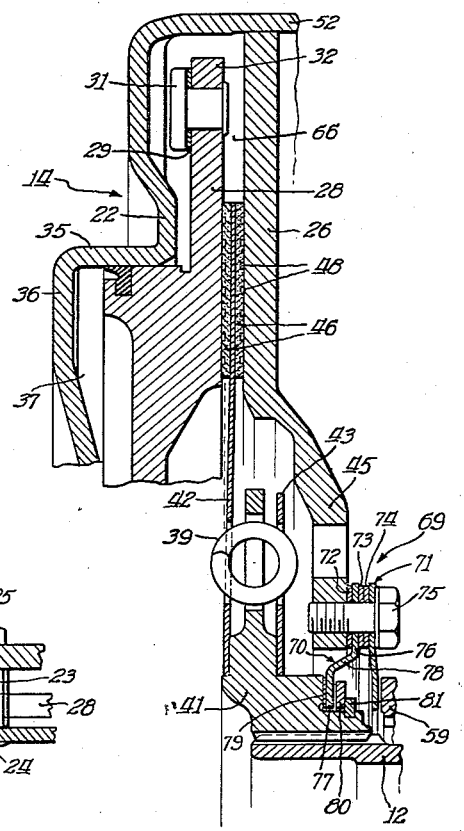
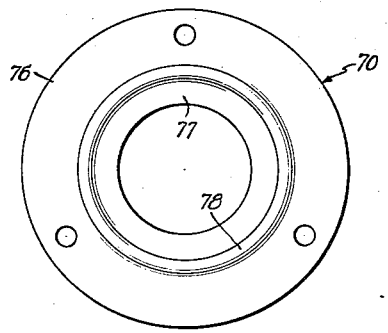
Inventor:
Reinhold C. Zeidler
By: H. J. Schmid
Atty.

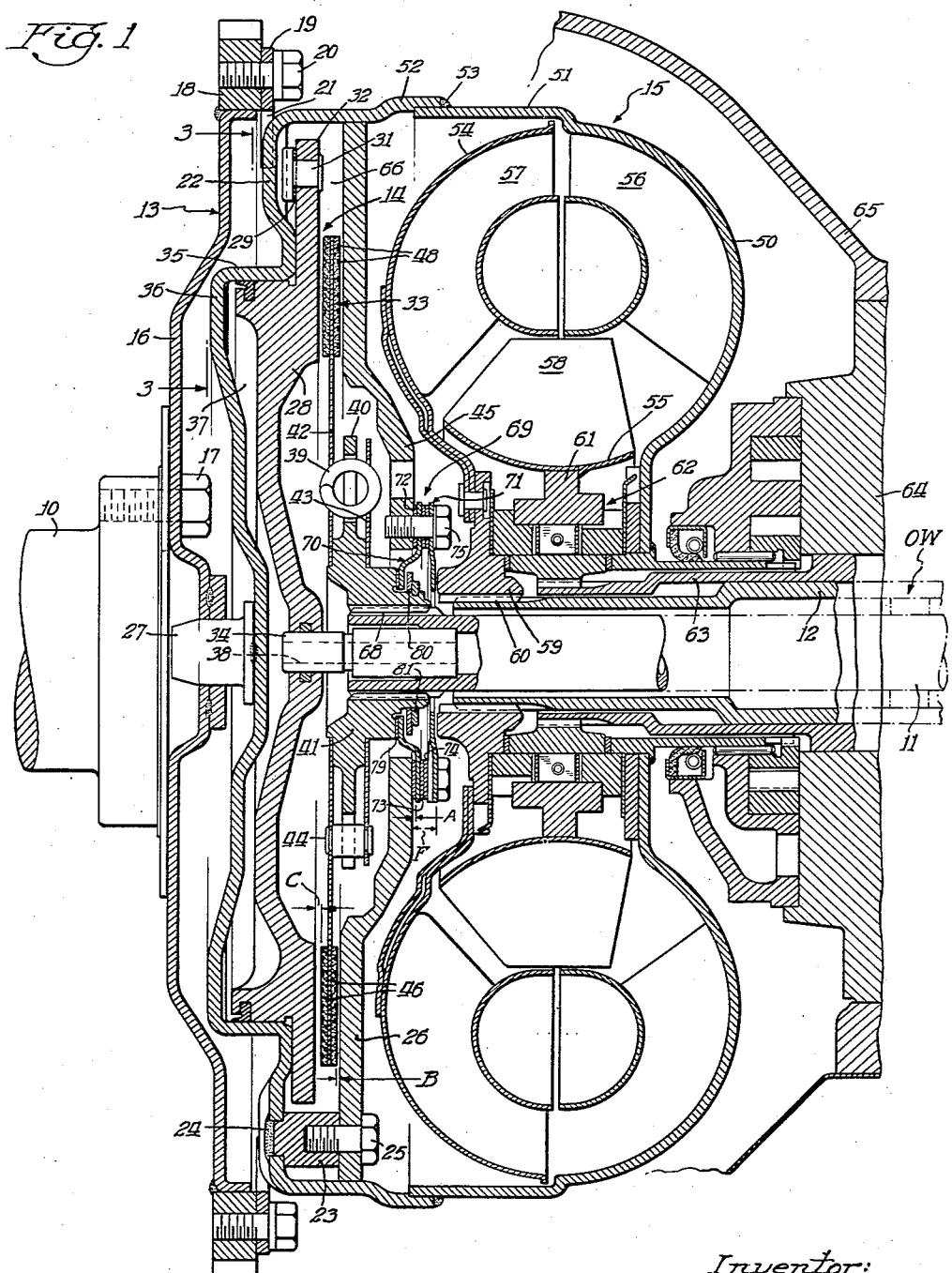

July 1, 1958  R. C. ZEIDLER  2,841,262
CLUTCH
Filed May 16, 1952  3 Sheets-Sheet 3
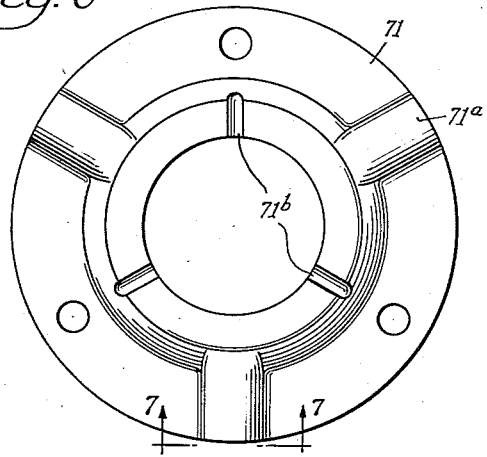
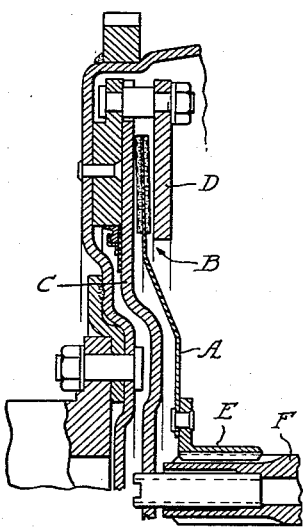
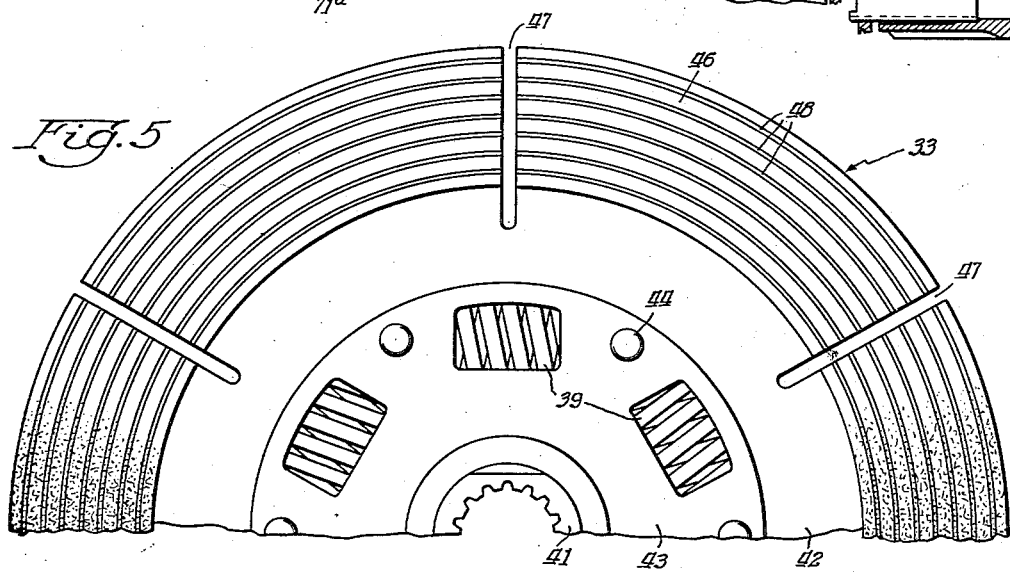
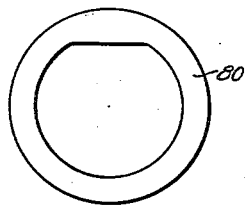
Inventor:
Reinhold C. Zeidler
By H. J. Schmid
Atty.

United States Patent Office 2,841,262
Patented July 1, 1958

2,841,262
CLUTCH

Reinhold C. Zeidler, Detroit, Mich., assignor to Borg-Warner Corporation, Chicago, Ill., a corporation of Illinois Application May 16, 1952, Serial No. 288,117

12 Claims. (Cl. 192—68)

This invention relates to friction-engaging devices, such as brakes and clutches, and control mechanism therefor.

An object of the present invention is to provide improved friction-engaging devices, such as clutches and brakes, and control mechanism to quickly and completely disengage the devices upon release of pressure engaging the same.

Another object of the invention is to provide improved friction-engaging devices of the lubricated plate type and control mechanism embodying means for positively separating and spacing the plates of the devices upon the release of engaging pressure.

A further object of the invention is to provide improved friction-engaging devices of the lubricated plate type having relatively rotatable plates including a pressure plate movable axially to engage a friction plate between the pressure plate and an axially fixed plate, the friction plate having friction facings formed of material, such as cork, adhering to the material, such as ferrous metal of the axially movable and fixed plates upon the application and release of pressure, and control mechanism providing means cooperating with the friction and axially fixed plates to insure detachment and thereby disengagement of the plates upon release of pressure by the axially movable plate.

Other objects and advantages of the invention will become apparent as the detailed description progresses, and in connection with the accompanying drawings in which:

Fig. 1 is a longitudinal, axial section of a drive mechanism including my improved friction-engaging device or friction clutch and control mechanism therefor, the clutch driving and driven plates being shown in disengaged condition;

Fig. 2 is an enlarged view of a fragmentary portion of the clutch and control mechanism therefor shown in Fig. 1, the clutch being shown in engaged condition;

Fig. 3 is a side view of a fragmentary portion of the clutch shown in Fig. 1, said view being taken on line 3—3 of Fig. 1;

Fig. 4 is a sectional view taken on line 4—4 of Fig. 3;

Fig. 5 is a side elevational view of the upper half of the driven clutch plate shown in Figs. 1 and 2;

Figs. 6 and 7 are views of a bearing of the clutch control mechanism, Fig. 6 being a side elevation thereof and Fig. 7 being a section thereof taken on line 7—7 of Fig. 6;

Fig. 8 is a side elevational view of a washer of the clutch control mechanism;

Fig. 9 is a side elevational view of another bearing of the clutch control mechanism; and Fig. 10 is a sectional view of a clutch to illustrate the prior art.

Referring to the drawings, my improved friction-engaging device and control mechanism therefor is shown, in a preferred embodiment of the invention, as a friction clutch structure, preferably, but not necessarily forming a portion of a drive mechanism shown in Fig. 1. More particularly, the drive mechanism illustrated in Fig. 1 comprises driving and driven shafts, the driving shaft being identified at 10 and the telescoping driven shafts being identified at 11 and 12, a flywheel assembly generally indicated at 13, the clutch generally indicated at 14, and a hydraulic torque converter structure indicated at 15. The flywheel assembly 13 includes a drive plate 16 bolted as at 17 to the drive or crankshaft 10, the drive plate 16 having at its outer periphery and secured thereto as by welding an annular toothed plate or flywheel 18.

The clutch 14 is drivingly connected to the flywheel 13 by an annular member 19 bolted at 20 to the flywheel 18, the member 19 have spaced radially inwardly extending lugs 21 received within slots in the clutch casing 22 to provide a driving connection between the flywheel 18 and the clutch 14, as shown in Fig. 1. The clutch casing 22 has a plurality of studs 23 which may be welded thereto as at 24 and to which is bolted, as at 25, a drive or back plate 26 so that the clutch casing 22 and the drive plate 26 will rotate in unison. It will be observed that the studs 23 through their connections 24 and 25 to the clutch casing 22 and the drive plate 26 will space the clutch casing and the drive plate a predetermined fixed distance from each other. The clutch casing 22 has an axially extending pilot 27 positioned in the flywheel 16.

The clutch 14 also comprises a pressure plate 28 connected to the clutch casing 22, as shown in Figs. 3 and 4, by a plurality of flexible steel straps 29, the opposite ends of the steel straps being respectively secured to the clutch casing 22 and the pressure plate 28 by rivets 30 and 31, the rivets 31 securing the straps 29 to radially projecting lugs 32 on the pressure plate. It will be observed that the pressure plate 28, through the medium of the flexible straps 29, is permitted to move toward and from the drive plate 26 of the clutch a sufficient distance to apply pressure to a driven plate 33 to pack the driven plate 33 between the pressure plate 28 and the drive plate 26. The pressure plate 28 has an opening at its axis through which extends a reduced pilot end 34 of the drive shaft 11.

The clutch casing 22 is provided with a cylindrical portion 35 engaging a cylindrical surface of the pressure plate 28. The cylindrical portion 35 and the radial wall 36 of the clutch casing 22 and the pressure plate 28 provide a pressure fluid chamber 37 within which fluid under pressure is received through an axial opening 38 in the shaft 11, the pressure fluid being controlled by any suitable means to be directed into the chamber 37 to actuate the pressure plate 28 into engagement with the driven plate 33 to engage the clutch 14 and to permit disengagement of the clutch by allowing the pressure fluid to be exhausted from the chamber 37 when disengagement of the clutch is desired, the pressure plate 28 thus acting as a piston and clutch-actuating member to provide drive between the shafts 10 and 11.

The driven clutch plate 33 is provided with a vibration dampener such as illustrated and described in U. S. Patent 2,042,570, the dampener comprising a coil spring 39 received within the radially extending flange 40 of the hub 41 and being disposed in openings in annular flat thin steel discs 42 and 43, the discs 42 and 43 being riveted for conjoint rotation by rivets 44 extending through openings in the radially extending flange 40 of the hub 41 so that the discs 42 and 43 move relative to the hub as permitted by the compression of the springs 39. It will be noted that the axially offset radially inwardly disposed portion 45 of the drive plate 26 receives the vibration dampener arrangement and hub of the driven plate assembly 33. The disc 42 of the drive plate assembly 33 is preferably formed of thin sheet metal and the radially outer extremity thereof is provided at opposite sides thereof with friction facings provided by a plurality of cork segments 46 (Figs. 1 and 5) engageable with the adjacent faces of the pressure plate 28 and the drive plate 26, the disc 42 having slots 47 therein defining segments to which are attached, as by bonding, the cork segments 46. The cork segments 46 have grooves 48 therein.

The torque converter 15 comprises an impeller 50 having a casing 51 connected to an axially extending flange 52 of the clutch casing 22 which as shown engages the radially outer periphery of the drive plate 26 for centering purposes, the flange 52 of the clutch casing 22 and the impeller casing 51 being connected together by a weld 53. The torque converter further comprises a turbine 54 and a stator 55, and each of the elements 50, 54 and 55 of the torque converter having vanes 56, 57, and 58 respectively having curvatures for providing torque multiplication ratios as is well known in the art. The turbine 54 has a tub 59 splined as at 60 to the sleeve shaft 12. The stator 55 has its hub 61 connected by means of a one-way clutch, generally indicated at 62, to a sleeve 63 fixed to the wall 64 of the stationary housing 65.

The hydraulic torque converter thus receives drive from the crankshaft 10, through the flywheel 13, the ring 21, and the clutch casing 22 to cause rotation of the impeller 50 and thereby the turbine 54 to rotate the sleeve shaft 12 by fluid circulating between the vanes 56, 57 and 58 of the torque converter. It will be seen from an inspection of Fig. 1 that the clutch casing 22 and impeller casing 51 provide a fluid chamber within which are disposed the turbine 54, the stator 55, and impeller vanes 56 the fluid in the impeller casing 51 having access to the chamber 66 in the clutch casing 22 through the various elements of the clutch control mechanism invention at the radially inner periphery of the drive plate 26, fluid in the hydraulic torque converter circuit flowing through the opening in the drive plate 26 into the chamber 66, this fluid being under pressure so that the pressure plate 28 will be moved rearwardly away from the driven plate 33 to disengage the driven plate 33 upon the release of the greater pressure of the fluid in the chamber 37.

It will be noted from an inspection of Fig. 1 that the hub 41 of the driven plate assembly 33 is splined as at 68 to the driven shaft 11 so that engagement of the clutch will cause drive to be transmitted through the clutch 14 from the crankshaft 10 to the driven shaft 11. The sleeve shaft 12, driven by the turbine 54 of the hydraulic torque converter 15, is connected to the drive shaft 11 by a one-way clutch OW that will normally transmit drive to the driven shaft 11 when the clutch is in disengaged condition. Upon engagement of the clutch 14, the clutch 14 will provide a direct drive connection between the shaft 10 and the shaft 11, drive from the shaft 10 through the torque converter to the shaft 12 being discontinued as the one-way clutch will disengage.

In prior clutch assemblies having a comparable clutch plate arrangement, such as shown in Fig. 10, trouble frequently arises due to the thin friction linings or cork segments of the driven plate assembly not releasing themselves quickly and completely from the driving surfaces of the pressure plate and the drive plate. It has been found that grooving and slotting the cork friction facings provides the most desired engaging characteristics and employing a thin steel driven disc (to which the facings are cemented) assists in the release of the clutch plates. More particularly, and referring to Fig. 10, it has been proposed that, to effect or obtain quick release of the engaged clutch, the thin steel disc A of the driven clutch plate assembly B be formed of conical shape so that, when the clutch is fully engaged, the coned rim portion of the disc is flattened out under the pressure applied thereto by the pressure plate C and back plate D. When the pressure plate moves away from the driven plate assembly, the disc A will resume its normal cone shape, thus causing the friction facings thereof to free themselves from engagement with the pressure back plates. However, in order to have this kind of driven member function as described above, the engaging splines of the hub E and sleeve shaft F must have certain characteristics so that the hub E of the driven plate assembly will be able to slide freely on the splines of the sleeve shaft. If there is rough machining at this point, or if the parts fit too tightly together, then the hub will not move freely, even though the disc resumes its normal cone shape upon release of the clutch and small portions of the friction facings will drag against the back and pressure plates, thus creating unwanted friction and loss in efficiency besides undesirable wear of the friction facings. Also, where the clutch assembly, as shown in Fig. 10, is utilized with a torque converter, as shown in Fig. 1, and when the clutch is disengaged and the drive is through the hydraulic torque converter, any tendency for the friction facings of the driven clutch plate assembly B to drag against the back plate and the pressure plate will cause the hydraulic torque converter to lose some of its efficiency as well as to generate and increase the heat of the circulating fluid in the hydraulic torque converter. As is well known, excessive heating of the circulating fluid in the hydraulic torque converter is a definite problem and the heating of the circulating fluid should be dissipated quickly to obtain maximum efficiency of the hydraulic torque converter.

Referring to Fig. 1, my improved clutch control mechanism is generally indicated at 69 and is adapted to provide for the quick and complete disengagement of the clutch plates 26, 28 and 33 upon movement of the pressure plate 28 away from the driven plate 33. Referring to Figs. 1 and 2 illustrating the released and engaged conditions of the clutch respectively, the control mechanism comprises an annular plate or bearing 70 (shown in Fig. 9 in side elevation) and another annular plate or bearing 71 (shown in detail in Figs. 6 and 7). Between the annular plate 70 and the radially inwardly extending axially offset portion 45 of the drive plate 26, there is disposed an annular shim 72, and between the annular bearings 70 and 71 are disposed annular shims 73 and 74, the shims spacing the radially inner portion 45 of the drive plate 26, and the annular bearings 70 and 71 for a purpose to be described. The bearings 70 and 71 and the shims having openings therein through which extend bolts 75 threaded to the radially inner portion 45 of the drive plate 26 to hold the latter and the bearings of the control mechanism in fixed relationship to each other. The bearing 70, as shown in Figs. 1 and 2, comprises axially and radially spaced portions 76 and 77 connected by a cone portion 78, the portion 76 being secured to the drive plate 26 as previously described and the portion 77 being shown in spaced relation to a washer or thrust bearing 80, and a shim 79 being disposed between and engaging the portion 77 and the adjacent radially extending surface of the hub 41. The bearing 80 and portion 77 of the bearing 70 surround a reduced axially extending portion of the hub 41 and within which there is provided a groove receiving a split snap ring 81 for retaining the bearing 70 and the washer 80 in assembly with the hub while permitting slight axial movement of the hub 41 and thereby the driven plate 33 relative to the bearing 70 and drive plate 26. The bearing 71, shown in detail in Figs. 6 and 7, has its radially extending inner portion in spaced relation to and having a slight clearance to the turbine hub 59 as clearly shown in Figs. 1 and 2.

The plate 71 as shown in detail in Figs. 6 and 7 is an annular member having a plurality of stiffening ribs 71ª, the radially inner portion of the plate 71 being provided with grooves 71ᵇ to permit the passage of oil for lubricating any frictional engagement between the plate 71 and the turbine hub 59 when the turbine thrust effects such engagement. It will be apparent from an inspection of Figs. 1 and 2 that, when the cluch is engaged, the clutch control mechanism described will permit very limited axial movement of the driven plate assembly 33 with respect to the sleeve shaft 12.

In the operation of the clutch assembly shown in Figs. 1 and 2, the spring steel friction-facing carrying disc 42 of the driven plate assembly 33 is normally flat. The clearance indicated at C between the pressure plate 28 and the driven plate 33 is greater than the clearance B between the driven plate 33 assembly and the drive plate 26 so that, upon engagement of the clutch, the spring steel disc 42 is deflected from its normal flat condition of Fig. 1 and will be flexed or distorted rearwardly as shown in Fig. 2 to assume a cone-shape, in view of the fact that the plates 70 and 71 of the control mechanism 69 between the driven plate hub 41 and turbine hub 59 limits and allows only slight axial movement of the driven plate 33 with respect to the fixed drive plate 26. Upon release of the clutch, the flexed disc 42 of the driven plate 33 will return to its flat shape shown in Fig. 1 and, as the plate 26 is axially fixed, the plate 33 will be quickly and completely released from the drive plate 26 and the pressure plate 28. This will be apparent from an inspection of Figs. 1 and 2 where it is obvious that, upon the pressure plate 28 returning to its clutch releasing position, the flexed disc 42 will cause the driven plate to follow and engage the plate 28 until the disc 42 returns to its normal flat condition, at which time, the driven plate will be disengaged from the pressure plate. It will be apparent from an inspection of Figs. 1 and 2 that the shims 72, 73 and 74 may be varied so that in the assembly of the clutch, the positions of the friction facings 46 of the driven plate assembly 33 may be controlled to insure that the friction facings may be accurately spaced from the pressure plate 28 and the drive plate 26 to obtain the tolerances B and C in Fig 1.

In experiments conducted with clutch assemblies, such as shown in Fig. 1, it has been found that, when the clutch is disengaged, the clutch plates consistently release quickly and completely with consequent elimination of frictional drag. It is desirable in a clutch assembly, such as described, to permit only slight axial movement of the hub 41 of the driven plate assembly 33 with respect to the drive plate 26 and the shaft 12. For example, if the snap ring 81 and the washer 80 were removed, the driven plate could freely move axially toward the pressure plate so that, when the clutch was released, the disc 42 of the driven plate would spring away from the back plate to free the driven plate from the back plate, but, should the friction facing engaging the pressure plate fail to release and stick to the pressure plate and it would thereby cause drag. By utilizing the washer 80 and snap ring 81 and allowing a small amount of running clearance endwise, they will cooperate with the bearing 70 to positively prevent the driven plate from following the pressure plate 28 to its released position as, when the disc 42 returns to its flat normal condition, the driven plate cannot follow the pressure plate 28 and the clearance, indicated at C in Fig. 1, between the pressure and driven plates is positively maintained.

In the assembly of a drive mechanism such as illustrated in Fig. 1, the clutch is assembled in the following manner. The clutch casing 22 and the pressure plate 28 are connected by the straps 29. A second subassembly is then provided by placing the back plate or drive plate 26 on the driven plate assembly 33 so that it will engage the adjacent friction facing, the bearing 70 is placed on the hub 41, and the portion 76 thereof is held firmly in place on top of the side face of the drive plate 26 and the clearance at "A" is then checked with a feeler gauge. These parts are designed so that this clearance "A" will always be more than desired so that one or more shims 72 may be required. For example, if it is desired to have a .030" clearance at B when the clutch is released, then the parts will be designed so that somewhat more than .036" clearance will be obtained at A when the check is made with the feeler gauge. The usually required shim 72 is then put in place, washer 80 and snap ring 81 are positioned on hub 41 and bearing 71 is placed on the shim 72, and bolts 75 inserted in openings in the bearings 70 and 71 and shim 72 and into the threaded openings in the back plate 26. This will make a loose assembly of the driven plate and the back plate. This assembly is then placed in the flywheel which has already assembled in it the pressure plate 28. The cap screws 25 are then inserted into the openings in the back plate, threaded into the lugs 23 and then drawn tight.

The hydraulic torque converter parts have been previously assembled in the impeller housing 50 so it is not necessary to make what is called "stack-up" check to adjust the end play in the converter parts. A special machine is used in production having the flywheel assembly on one side thereof and the impeller assembly on the other side thereof, both assemblies being positioned with their open sides up. By means of a differential mechanism, a check is made of both assemblies at the same time to determine whether shims 72 and 73 will be necessary between the bearings 70 and 71 to obtain the desired dimension indicated at F in Fig. 1. This dimension permits an endwise running clearance around .010" between the bearing 71 and the forward end of the turbine hub. When the correct number of shims (73 and 74 in this case) are inserted between the bearings 70 and 71 to obtain this dimension, the cap screws 75 are then inserted and tightened. The flywheel and impeller assemblies are then placed together so that their outer peripheries 51 and 52 pilot together firmly and they are then welded together as at 53.

It will be apparent from the foregoing description that I have provided an improved clutch assembly and novel control mechanism having means for positively, quickly and completely causing disengagement and release of clutch plates of a clutch assembly.

While I have described the invention with respect to a clutch assembly, it will be readily apparent to those skilled in the art that the invention may also be applied to a friction type brake having one or more driven members positioned between a stationary member and an axially movable pressure plate member. Accordingly, it will be apparent that the use of the control mechanism herein described is not to be limited to a clutch assembly shown and described but is to be limited only by the scope of the appended claims.

I claim:

1. In a friction-engaging device, relatively rotatable plates including a friction plate, an axially fixed plate, and a pressure plate movable in opposite axial directions from and to a neutral position to engage said plates and to disengage said plates; means supporting said friction plate and permitting axial movement of said friction plate; and means extending between and adjustably connecting said friction and fixed plates for relative roation therebetween and holding said friction plate in axially spaced relation to said pressure and fixed plates, when said pressure plate is in its neutral position, and positively preventing axial movement of said friction plate during movement of said pressure plate to its neutral position.

2. In a friction-engaging device, relatively rotatable plates including a friction plate, an axially fixed plate, and a pressure plate movable in opposite axial directions from and to a neutral position to engage said plates and to disengage said plates; and means extending generally radially between and adjustably connecting said friction and fixed plates for relative rotation therebetween and holding said friction plate in axially spaced relation to said pressure and fixed plates, when said pressure plate is in its neutral position, and positively preventing axial movement of said friction plate during movement of said pressure plate to its neutral position.

3. In a friction-engaging device, relatively rotatable plates including an axially fixed plate, an axially movable pressure plate, and a friction plate between said fixed and movable plates and engageable therewith upon movement of said pressure plate toward said fixed plate; and means extending between and connecting said friction plate and one of said fixed and movable plates for relative rotation therebetween and operative to disengage said friction plate from said fixed and pressure plates upon movement of said pressure plate from said fixed plate.

4. In a friction-engaging device, relatively rotatable plates including an axially fixed plate, an axially movable pressure plate, and a friction plate between said fixed and movable plates and engageable therewith upon movement of said pressure plate toward said fixed plate; and means extending between and connecting said friction plate and said fixed plate for relative rotation therebetween and operative to disengage said friction plate from said fixed and pressure plates upon movement of said pressure plate from said fixed plate.

5. In a friction-engaging device, relatively rotatable plates including an axially fixed plate, an axially movable pressure plate, and a friction plate between said fixed and movable plates and engageable therewith upon movement of said pressure plate toward said fixed plate; a bearing member secured to one of said fixed and movable plates and having a portion extending toward said friction plate; and means connecting said member and said friction plate for relative rotation therebetween and operative to disengage said friction plate from said pressure plate and fixed plate upon movement of said pressure plate from said fixed plate.

6. In a friction engaging device, relatively rotatable plates including an axially fixed plate, an axially movable pressure plate, and a friction plate between said fixed and movable plates and engageable therewith upon movement of said pressure plate toward said fixed plate; a bearing member secured to said fixed plate and having a portion extending toward said friction plate; and means extending between and connecting said member and said friction plate for relative rotation therebetween and operative to disengage said friction plate from said pressure plate and fixed plate upon movement of said pressure plate from said fixed plate.

7. In a friction-engaging device, relatively rotatable plates including an axially movable pressure plate, an axially fixed drive plate, and a friction plate between said plates and comprising an annular resilient member supporting friction facings in spaced relation to said pressure and drive plates and engageable by said pressure and drive plates, said friction facings and said pressure and drive plates being formed of materials adherable to each other by pressure applied by said pressure plate upon axial movement of said pressure plate in one direction toward said drive plate to engage said plates; means connecting said friction plate and said drive plate for relative rotation therebetween and for holding one of the circumferential edges of said resilient member in axially fixed and spaced relation to said drive plate and said pressure plate to effect flexing of said resilient member toward said drive plate to engage one of said friction facings with said drive plate upon movement of said pressure plate into engagement with the other of said friction facings, movement of said pressure plate in the opposite axial direction causing the energy stored in said flexed resilient member to be released to move the member away from said drive plate to thereby detach said one friction facing from said drive plate, and subsequently said holding means preventing axial movement of said friction plate with said pressure plate to thereby detach said pressure plate and said other friction facing.

8. In a friction clutch, axially aligned and spaced drive and driven shafts, a casing containing oil, a plurality of friction plates in said casing comprising a drive plate of ferrous metal connected to said drive shaft and fixed against movement axially of said shafts, a pressure plate of ferrous metal connected to and rotatable with said drive plate and movable axially to and from said drive plate, and a friction plate between said drive and pressure plates and including a hub axially slidably supported on said driven shaft and a resilient flat disc connected to said hub and having cork friction facings on opposite sides thereof engageable by said drive and pressure plates during axial movement of said pressure plate toward said drive plate; and means connected to said drive plate and said hub allowing relative rotation therebetween for positioning said resilient member to positively space said friction facings from said drive and pressure plates while preventing axial movement of said hub.

9. In a friction clutch, driving and driven shafts; a plurality of friction plates rotatable about an axis and comprising a drive plate connected to said driving shaft and fixed against movement along said axis, a pressure plate connected to said drive plate and movable toward and from said drive plate along said axis, a driven plate between said drive and pressure plates and including a flat resilient disc having friction facings on opposite sides thereof engageable with said drive and pressure plates and a hub supporting said resilient member on said driven shaft and permitting axial movement of said driven plate, said pressure plate and drive plate being formed of materials adhering to the material of said friction facings upon the application of and release of pressure by said pressure plate in engaging the plates; and stop means connected to said drive plate and said driven plate allowing relative rotation therebetween and preventing axial movement of said driven plate hub, said pressure plate flexing said resilient member toward said drive plate during axial movement of said pressure plate to engage said plates to thereby store energy in said resilient member releasable to detach said drive plate and the friction facing engaged thereby, and said stop means limiting the return movement of said resilient member and thereby the friction facing, engaged by said pressure plate, to effect detachment of the latter facing from the pressure plate, upon axial movement of said pressure plate away from said drive plate.

10. In a friction clutch, axially aligned driving and driven shafts; an annular drive plate connected to said driving shaft and fixed against movement axially of said shafts; a pressure plate supported by said drive shaft for axial movement toward and from said drive plate; a driven plate spaced from and between said drive and pressure plates and including a resilient member supporting friction facings between said drive and pressure plates, and a hub connected to said member and having a splined connection to said driven shaft and a reduced axially extending portion, said drive plate extending radially inwardly and having its inner periphery adjacent said hub; an annular thrust member secured to the radially inner periphery of said drive plate, surrounding said reduced portion of said hub, and positioned adjacent one of the axially spaced sides of said hub to hold said hub against movement in one axial direction during movement of said pressure plate; and means connected to said reduced portion of said hub and engaging said member to hold said hub against movement in the opposite axial direction, during movement of said pressure plate.

11. In a friction clutch, axially aligned driving and driven shafts; a casing connected to said drive shaft and containing oil; a plurality of clutch plates in said casing and including an annular drive plate fixed to said casing and surrounding said driven shaft, a pressure plate supported by and connected to said casing for movement toward and from said drive plate, and a driven plate between said drive and pressure plates and including a hub having a splined connection to said driven shaft and a resilient member connected to said hub and carrying friction facings in axially spaced relation to said drive and pressure plates and engageable therewith upon movement of said pressure plate from a neutral position to an operative position engaging said plates, the radially inner periphery of said drive plate extending toward said hub; and means connecting the radially inner periphery of said drive plate to said hub to permit relative rotation thereof while holding said hub against axial movement on said driven shaft during movement of said pressure plate from its neutral position to its operative position and vice versa, said means including an annular thrust bearing having one side thereof engaging said hub to prevent movement of said hub in one axial direction; and stop means on said hub and engaging the other side of said bearing to prevent movement of said hub in the other axial direction.

12. In a friction clutch, axially aligned driving and driven shafts; a casing connected to said drive shaft and containing oil; a plurality of clutch plates in said casing and including an annular drive plate fixed to said casing and surrounding said driven shaft, a pressure plate supported by and connected to said casing for movement toward and from said drive plate, a driven plate between said drive and pressure plates and including a hub having a splined connection to said driven shaft and a resilient member connected to said hub and carrying friction facings in axially spaced relation to said drive and pressure plates and engageable therewith upon movement of said pressure plate from a neutral position to an operative position engaging said plates, said friction facings being of a material adherable to the material of said pressure and drive plates upon the application of and release of pressure by said pressure plate, the radially inner periphery of said drive plate extending toward said hub; and means connecting the radially inner periphery of said drive plate to said hub to permit relative rotation thereof while holding said hub against axial movement on said driven shaft during movement of said pressure plate from its neutral position to its operative position and vice versa, said means including an annular thrust bearing having one side thereof engaging said hub to prevent movement of said hub in one axial direction, and stop means on said hub and engaging the other side of said bearing to prevent movement of said hub in the other axial direction, movement of said pressure plate from its neutral position to its operative position to engage said plates flexing said resilient member to provide energy releasable to detach said adhered surfaces of said drive plate and the engaged friction facing upon movement of said pressure plate to its neutral position, said connecting means limiting the return movement of said resilient member and thereby the friction facing, engaged by said pressure plate, to effect detachment of the latter facing from the pressure plate upon movement of said pressure plate to its neutral position.

References Cited in the file of this patent

UNITED STATES PATENTS

| | | |
|---|---|---|
| 2,199,801 | Kattwinkel | May 7, 1940 |
| 2,272,434 | Schjolin | Feb. 10, 1942 |
| 2,555,860 | Reed | June 5, 1951 |
| 2,568,007 | Jandasek | Sept. 18, 1951 |

FOREIGN PATENTS

| | | |
|---|---|---|
| 636,240 | France | Apr. 4, 1928 |